(12) United States Patent
Chandhok et al.

(10) Patent No.: US 9,208,392 B2
(45) Date of Patent: Dec. 8, 2015

(54) METHODS AND APPARATUS FOR PROGRESSIVE PATTERN MATCHING IN A MOBILE ENVIRONMENT

(75) Inventors: Ravinder P. Chandhok, Del Mar, CA (US); Douglas M. Crockett, San Diego, CA (US); Mark Bapst, South Barrington, IL (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 13/406,518

(22) Filed: Feb. 27, 2012

(65) Prior Publication Data

US 2013/0071035 A1     Mar. 21, 2013

Related U.S. Application Data

(60) Provisional application No. 61/536,905, filed on Sep. 20, 2011.

(51) Int. Cl.
| | |
|---|---|
| *G06K 9/64* | (2006.01) |
| *G06K 9/68* | (2006.01) |
| *G06K 9/00* | (2006.01) |
| *G06F 17/30* | (2006.01) |

(52) U.S. Cl.
CPC ........ *G06K 9/00973* (2013.01); *G06F 17/3028* (2013.01)

(58) Field of Classification Search
None
See application file for complete search history.

(56) References Cited

U.S. PATENT DOCUMENTS

| | | | |
|---|---|---|---|
| 6,041,134 A * | 3/2000 | Merjanian | 382/126 |
| 7,127,106 B1 | 10/2006 | Neil et al. | |
| 8,391,609 B2 * | 3/2013 | Huntington et al. | 382/194 |
| 8,432,297 B2 * | 4/2013 | Sonnabend et al. | 340/932.2 |
| 8,639,034 B2 * | 1/2014 | Liu et al. | 382/190 |

(Continued)

FOREIGN PATENT DOCUMENTS

| | | | |
|---|---|---|---|
| JP | 2002007432 A | 1/2002 | |
| JP | 2005208761 A | 8/2005 | |

(Continued)

OTHER PUBLICATIONS

Castelli, V et al., "Progressive Search and Retrieval in Large Image Archives", IBM Journal of Research and Development, International Business Machines Corporation, New York, NY, US, vol. 42, No. 2, Mar. 1, 1998, pp. 253-268, XP000764178, ISSN: 0018-8646.

(Continued)

*Primary Examiner* — Vikkram Bali
(74) *Attorney, Agent, or Firm* — Scott A. Barker

(57) ABSTRACT

Methods and apparatus for performing efficient pattern matching in a client-server network are described herein. A communication device acquires an object to be matched. At least one reduced set of features is extracted from the object to be matched and a determination as to whether the object to be matched matches one of a plurality of known objects in a local library stored on the communication device is generated. An indication representing a match of the object is presented if the determination indicates a local match exists in the local library. A match request including the at least one reduced set of features is transmitted for a remote matching determination when the determination indicates that no local match exists in the local library. In accordance with some aspects, a series of one or more match requests may be transmitted for a remote matching determination.

47 Claims, 8 Drawing Sheets

(56) References Cited

U.S. PATENT DOCUMENTS

| | | |
|---|---|---|
| 2002/0019819 A1 | 2/2002 | Sekiguchi et al. |
| 2004/0096107 A1 | 5/2004 | Ii et al. |
| 2006/0026148 A1 | 2/2006 | Furuhashi et al. |
| 2006/0262976 A1 | 11/2006 | Hart et al. |
| 2008/0095448 A1 | 4/2008 | Ono et al. |
| 2009/0100050 A1 | 4/2009 | Erol et al. |
| 2009/0202147 A1 | 8/2009 | Sambongi |
| 2009/0231441 A1 | 9/2009 | Walker et al. |
| 2010/0215277 A1 | 8/2010 | Huntington et al. |

FOREIGN PATENT DOCUMENTS

| | | |
|---|---|---|
| KR | 20060001644 A | 1/2006 |
| KR | 20100114819 A | 10/2010 |
| TW | 200951832 A | 12/2009 |
| WO | 2007004522 A1 | 1/2007 |

OTHER PUBLICATIONS

Hong, D et al., "Refining image retrieval based on context-driven methods", Proceedings of SPIE, vol. 3656, Dec. 17, 1998, pp. 581-592, XP055050079, ISSN: 0277-786X, DOI: 10.1117/12.333878.

International Search Report and Written Opinion—PCT/US2012/052529—ISA/EPO—Jan. 30, 2013.

Taiwan Search Report—TW101132602—TIPO—Jul. 15, 2014.

\* cited by examiner

METHODS AND APPARATUS FOR PROGRESSIVE PATTERN MATCHING IN A MOBILE ENVIRONMENT

CLAIM OF PRIORITY UNDER 35 U.S.C. §119

The present Application for Patent claims priority to Provisional Application No. 61/536,905 entitled "Methods and Apparatus for Progressive Pattern Matching in Mobile Environment" filed Sep. 20, 2011, and assigned to the assignee hereof and hereby expressly incorporated by reference herein.

BACKGROUND

This application relates generally to pattern matching, and more particularly to balancing computational and/or communication workload associated with pattern matching in a mobile environment.

Mobile applications that rely upon pattern recognition, such as augmented reality, visual searching, image recognition, etc., require a large amount of computational power. In addition, a library of target patterns must be accessible, either on the communication device, e.g. the client device, or within a remote computing device, such as a server on the Internet. Computational and target library limitations can limit usefulness and user experience of such applications. Moreover, these limitations can place an undue burden on the communication network between the client and server.

SUMMARY

The following presents a simplified summary of one or more aspects in order to provide a basic understanding of such aspects. This summary is not an extensive overview of all contemplated aspects, and is intended to neither identify key nor critical elements of all aspects nor delineate the scope of any or all aspects. Its sole purpose is to present some concepts of one or more aspects in a simplified form as a prelude to the more detailed description that is presented later.

In accordance with some aspects, a method of efficiently performing pattern matching in a client-server network includes acquiring, by a communication device, an object to be matched. The method further includes extracting at least one reduced set of features from the object to be matched and generating a determination as to whether the object to be matched matches one of a plurality of known objects in a local library stored on the communication device. The method further includes presenting an indication representing a match of the object if the determination indicates a local match exists in the local library. Additionally, the method includes transmitting a match request including the at least one reduced set of features for a remote matching determination when the determination indicates that no local match exists in the local library. In accordance with some aspects, a series of one or more match requests may be transmitted for a remote matching determination.

In accordance with some aspects, a computer program product comprises a computer readable-medium comprising at least one instruction for causing a computer to acquire an object to be matched. The computer readable medium further comprises at least one instruction for causing the computer to extract at least one reduced set of features from the object to be matched. The computer-readable medium also includes at least one instruction for causing the computer to generate a determination as to whether the object to be matched matches one of a plurality of known objects in a local library. At least one instruction for causing the computer to present an indication representing a match of the object if the determination indicates a local match exists in the local library is also included in the computer-readable medium. Additionally, the computer-readable medium includes at least one instruction for causing the computer to transmit a match request including the at least one reduced set of features for a remote matching determination when the determination indicates that no local match exists in the local library.

In accordance with some aspects, an apparatus comprises means for acquiring an object to be matched. The apparatus may also include means for extracting at least one reduced set of features from the object to be matched. In addition, the apparatus may comprise means for generating a determination as to whether the object to be matched matches one of a plurality of known objects in a local library. The apparatus also includes means for presenting an indication representing a match of the object if the determination indicates a local match exists in the local library. Additionally, the apparatus includes means for transmitting a match request including the at least one reduced set of features for a remote matching determination when the determination indicates that no local match exists in the local library.

In accordance with some aspects, an apparatus for efficiently performing pattern matching in a client-server network comprises at least one processor configured to acquire an object to be matched, extract at least one reduced set of features from the object to be matched, generate a determination as to whether the object to be matched matches one of a plurality of known objects in a local library, present an indication representing a match of the object if the determination indicates a local match exists in the local library, and transmit a match request including the at least one reduced set of features for a remote matching determination when the determination indicates that no local match exists in the local library. The apparatus may also include a memory coupled to the at least one processor.

In accordance with some aspects, a method of using pattern recognition to present information, comprises receiving, from a communication device at a remotely located computational component, an initial reduced set of features extracted from an object to be matched. The method may also include progressively receiving additional reduced sets of features extracted from the object to be matched. In addition, the method includes searching a library for an object matching either or both of the initial reduced set of features and the additional reduced sets of features until a potential match is found that meets a confidence factor. The method also includes, upon determining the potential match for the object, transmitting an identification of the matched object.

In accordance with some aspects, a computer program product comprises a computer-readable medium comprising at least one instruction for causing a computer to receive, from a remotely-located communication device, an initial reduced set of features extracted from an object to be matched. The computer-readable medium also includes at least one instruction for causing the computer to progressively receive additional reduced sets of features extracted from the object to be matched. The computer-readable medium further includes at least one instruction for causing the computer to search a library for an object matching either or both of the initial reduced set of features and the additional reduced sets of features until a potential match is found that meets a confidence factor. Additionally, the computer-readable medium includes at least one instruction for causing the computer to, upon determining the potential match for the object, transmit an identification of the matched object.

In accordance with some aspects, an apparatus comprises means for receiving, from a remotely-located communication device, an initial reduced set of features extracted from an object to be matched. The apparatus may also include means for progressively receiving additional reduced sets of features extracted from the object to be matched. Additionally, the apparatus includes means for searching a library for an object matching either or both of the initial reduced set of features and the additional reduced sets of features until a potential match is found that meets a confidence factor. The apparatus also includes means for, upon determining the potential match for the object, transmitting an identification of the matched object.

In accordance with some aspects, an apparatus for using pattern recognition to present information comprises a processor configured to receive, from a remotely-located communication device, an initial reduced set of features extracted from an object to be matched, progressively receive additional reduced sets of features extracted from the object to be matched, search a library for an object matching either or both of the initial reduced set of features and the additional reduced sets of features until a potential match is found that meets a confidence factor; and, upon determining the potential match for the object, transmit an identification of the matched object. The apparatus also includes a memory coupled to the at least one processor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The apparatus and methods described herein enable computation and communication costs to be reduced when performing pattern matching in a mobile environment. A communication device may be configured to perform initial processing on an object for which identification is desired. An object may include for example, an image, a video clip, an audio clip, text, etc. The communication device may maintain a local object library, and may make one or more initial attempts to match the object to be identified by searching the local object library. If the local search is unsuccessful, the communication device may reduce the size of the object by extracting one or more reduced sets of features from the object, and progressively sending the reduced sets of features to a server to request identification. The server attempts to find a match for the object based on the progressively received reduced sets of features, and may provide multiple possible matches, each having a respective confidence factor. The communication device may begin by sending an initial reduced set of features extracted from the object to the server, and may progressively send additional reduced sets of features relating to the object, wherein each of the additional reduced sets of features has a progressively higher resolution or provides different information about the object, until a match meeting a confidence factor is found.

Figure 1:
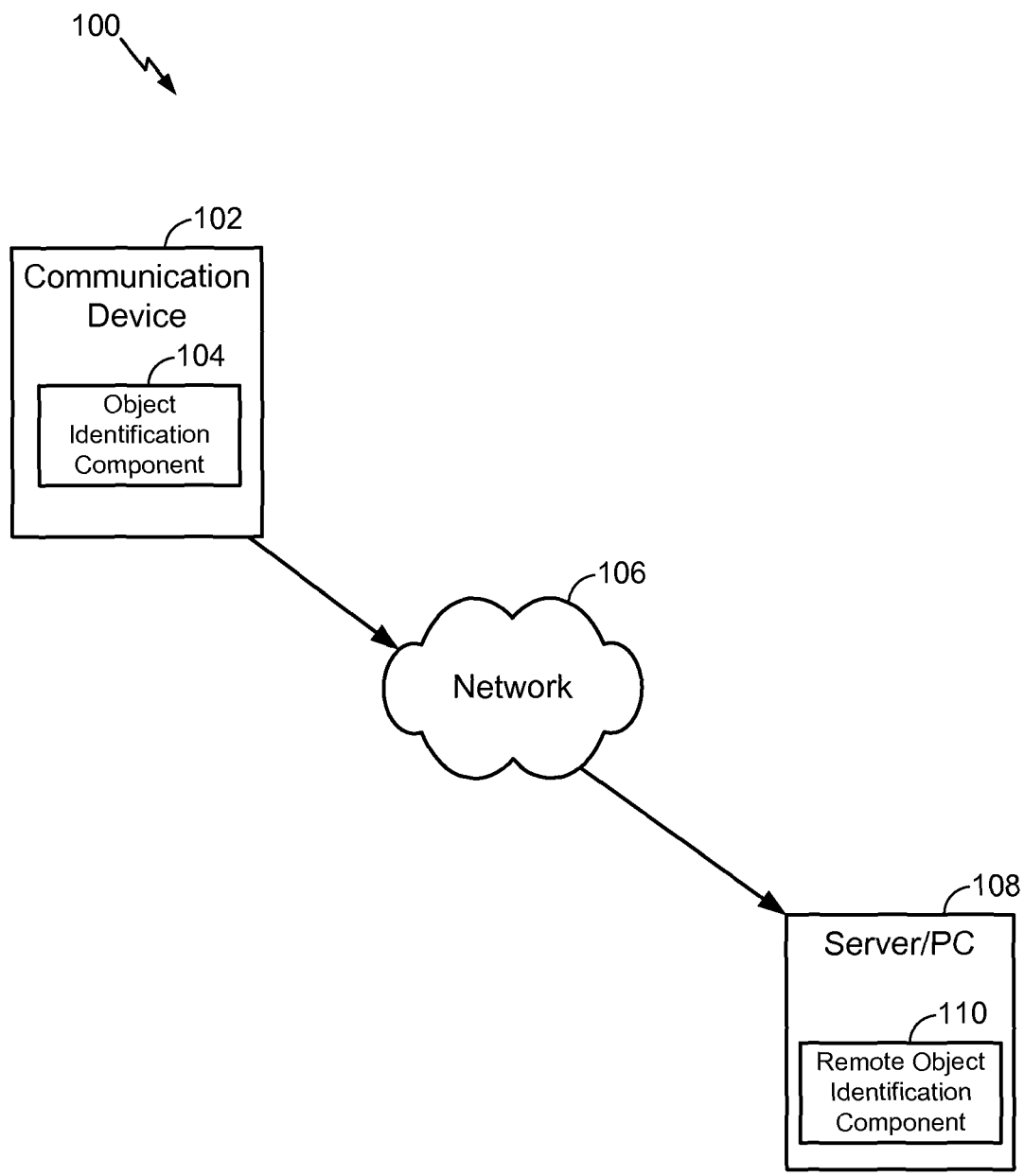
FIG. 1 is an exemplary system for implementing various aspects.

FIG. 1 depicts an exemplary client-server system 100 that may be used to perform progressive pattern matching, in accordance with some aspects. System 100 may include one or more client devices, such as communication devices 102, one or more access networks 106 and one or more servers or computing devices 108. Communication device 102 may include, for example, any data or cellular device that may connect to an access network 106. Communication device 102 may also include any data or cellular device capable of capturing media content, e.g., pictures, video, and sound files, among other media content. Communication device 102 may be, for example, a cellular telephone, a navigation system, a computing device, a camera, a PDA, a music device, or a handheld device having wired or wireless connection capability, among other devices. As shown in FIG. 1, communication device 102 may include an object identification component 104 to facilitate identifying a requested object. Access network 106 may provide various types of communication connections, e.g. wired and/or wireless, to communication device 102 and computing device 108. In an aspect, for example, communication device 102 may capture and send an object, such as but not limited to various forms of media content, via access network 106 to computing device 108. Computing device 108 may include a remote object identification component 110. For example, communication device 102 may capture an object in the form of an image using a connected camera, and may transmit the captured object, via access network 106, to computing device 108, along with a request to identify the object. Progressive pattern matching may be used to identify the object, wherein the object identification component 104 may first progressively extract a plurality of reduced sets of features from the object, and may progressively send the extracted reduced sets of features to the server for use in identifying the object using remote object identification component 110, e.g., when communication device 102 is unable to identify the object. Other examples of capturing an object include, for example, capturing an audio clip using an audio recorder, capturing text via a text scanning application, and/or any other object capture.

Figure 2:
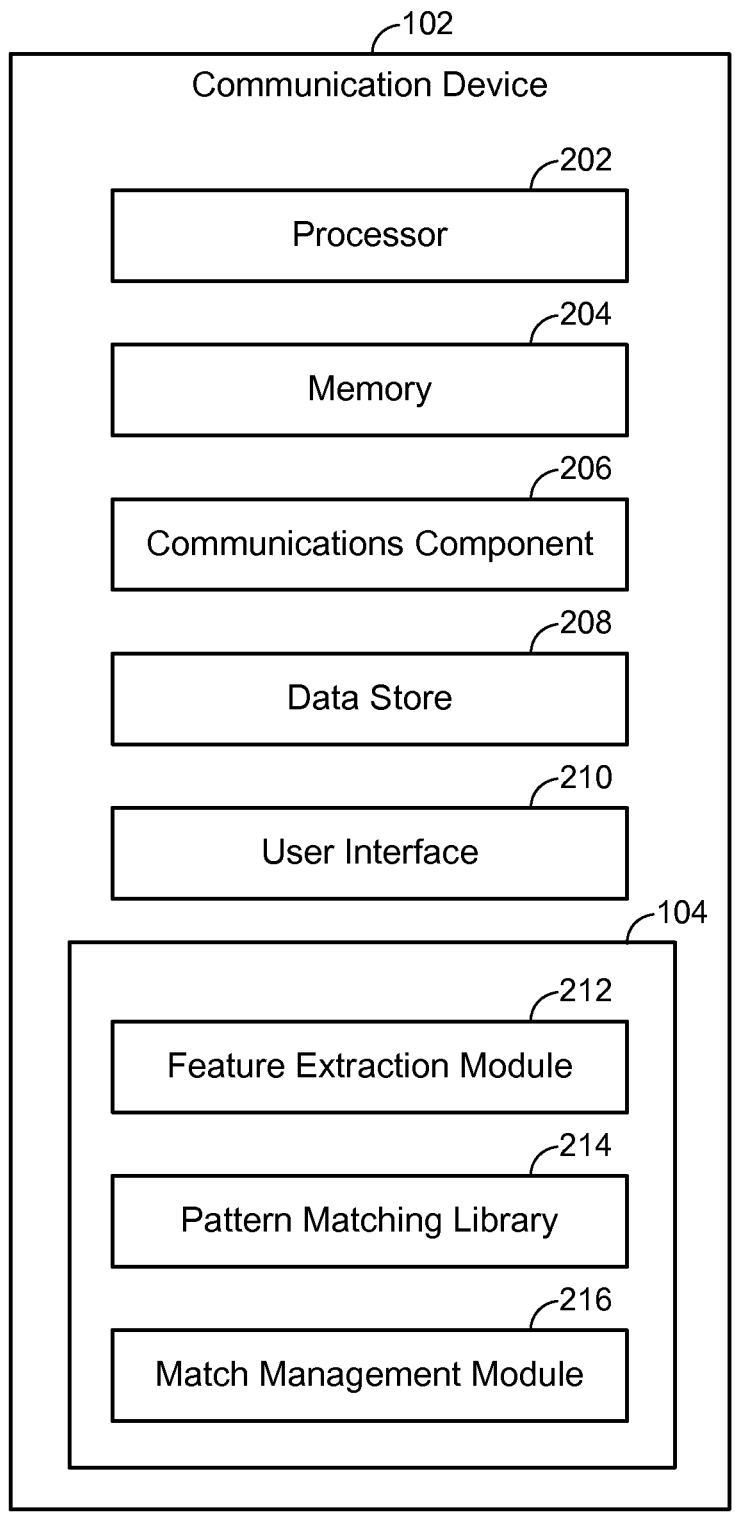
FIG. 2 depicts an exemplary communication device in accordance with some aspects.

Communication device 102 is depicted in greater detail in FIG. 2, according to one aspect. Communication device 102 may include a processor 202 for carrying out processing functions associated with one or more of components and functions described herein. Processor 202 can include a single or multiple set of processors or multi-core processors. Moreover, processor 202 can be implemented as an integrated processing system and/or a distributed processing system.

Communication device 102 further includes a memory 204, such as for storing data used herein and/or local versions of applications being executed by processor 202. Memory 204 can include any type of memory usable by a computer, such as random access memory (RAM), read only memory (ROM), tapes, magnetic discs, optical discs, volatile memory, non-volatile memory, and any combination thereof. Applications may include, for example, one or more context-specific pattern matching applications.

Further, communication device 102 may include a communications component 206 that provides for establishing and maintaining communications with one or more parties utilizing hardware, software, and services as described herein. Communications component 206 may carry communications between components on communication device 102, as well as between communication device 102 and external devices, such as devices located across a communications network and/or devices serially or locally connected to communication device 102. For example, communications component 206 may include one or more buses, and may further include transmit chain components and receive chain components associated with a transmitter and receiver, respectively, operable for interfacing with external devices.

Additionally, communication device 102 may further include a data store 208, which can be any suitable combination of hardware and/or software, that provides for mass storage of information, databases, and programs employed in connection with aspects described herein. For example, data store 208 may be a data repository for applications not currently being executed by processor 202.

Communication device 102 may additionally include a user interface component 210 operable to receive inputs from a user of communication device 102, and further operable to generate outputs for presentation to the user. User interface component 210 may include one or more input devices, including but not limited to a keyboard, a number pad, a mouse, a touch-sensitive display, a navigation key, a function key, a microphone, a voice recognition component, a still camera, a video camera, an audio recorder, and/or any other mechanism capable of receiving an input, or any combination thereof. The one or more input devices may be used to capture an object for which pattern matching is desired. Further, user interface component 210 may include one or more output devices, including but not limited to a display, a speaker, a haptic feedback mechanism, a printer, any other mechanism capable of presenting an output, or any combination thereof.

Communication device 102 may include object identification component 104, which may include a feature extraction module 212 configured to create reduced sets of features from an object for which pattern matching is desired. The reduced sets of features are smaller in memory or data size than the original object, thereby reducing communication and/or processing costs. Communication device 102 may be configured to request pattern matching for a plurality of types of objects such as, for example, a static image, a dynamic image, audio, text, video, a matrix, a barcode, a word, a letter, a sign language gesture, a song, etc. For example, the original object may be defined or represented by a relatively large amount of data, which correspondingly may require a relatively large amount of memory space for storage as well as computational and communication power to perform pattern recognition. Accordingly, in some aspects, feature extraction module 212 creates one or more reduced sets of features extracted from the object that are smaller in size, e.g. that represent the object or a portion of the object using a relatively smaller amount of data as compared to the original amount of data. Techniques for extracting features may include, for example, scissoring, edge detection, progressive scanning, corner detection, etc.

In accordance with some aspects, objection identification component 104 may also include a local pattern matching library 214 for storing a relatively small amount or number of common patterns representing known objects as compared to a relative large amount or number of common patterns representing known objects that may be stored remotely, such as at the server. This enables communication device 102, such as via execution of a match management module 216, which may in one example also be a part of objection identification component 104, to quickly detect common patterns between the object to be matched and objects represented in local pattern matching library 214 without communicating with an external server. For example, in one aspect, match management module 216 may include one or more matching functions that compare one or more features of the object to be matched with one or more features of objects represented in local pattern matching library 214, and determines a match, for example, based on a level of similarity. As such, in some aspects, match management module 216 attempts to find a match in the local pattern matching library 214 based on an entirety of the object to be matched, while in other aspects match management module 216 attempts to find a match in the local pattern matching library 214 progressively based on one or more of the reduced sets of features of the object to be matched as generated by feature extraction module 212. For those objects that cannot be matched via local pattern matching library 214, match management module 216 may progressively send one or more of the reduced sets of features created by feature extraction module 212 to an external server. Match management module 216 may include a progressive transmission function configured to send an initial reduced set of features to an external server, such as computing device 108, for pattern matching. Match management module 216, executing a progressive transmission algorithm, may progressively send additional reduced sets of features extracted from the object until a match is found. The additional reduced sets of features provide additional and/or different information extracted from the object that can be used to identify the object. In some aspects, match management module 216 may send the additional reduced sets of features substantially continuously until a match is received. In other aspects, the additional reduced sets of features may be sent on a periodic basis while waiting for a match.

Match management module 216 may also be configured to receive indications of potential matches from the server. Indications may include, for example, a textual identification of the potentially matching object, a link to a website containing information about the potentially matching object, etc. Match management module 216 may present the potential matches to a user via a user interface. A response from the user may indicate whether one of the potential matches is an actual match. Thus, upon receipt of the user input, match management module 216 may continue the progressive sending if the user input does not indicate a match, or may terminate the progressive sending if a match is indicated.

For example, in one aspect, the initial reduced set of features may be created by performing an edge detection operation on the object, and only the edges of the object may be transmitted. If the communication device 102 does not receive a match based on the initial reduced set of features generated by the edge detection operation, the match management module 216 can send another reduced set of features having more or different features than the initial reduced set of features. For example, in an aspect, the progressively transmitted reduced sets of features may include a progressively increasing number of additional or different features within the edges defined by the initial reduced set of features. In some aspects, match management module 216 can automatically send additional reduced sets of features until a match is found (e.g., a client-initiated match request). In other aspects, match management module 216 can send additional reduced sets of features upon request by the server performing the pattern match (e.g., a server-initiated request).

In some aspects, match management module 216 may be configured to send contextual information along with one or more of the reduced sets of features. Contextual information may include, for example, location information, user preference information, time, and/or any other contextual information that can aid the server in finding a match. The contextual information may be user provided, or may be derived by interaction with one or more components of communication device 102. For example, if communication device 102 includes a location module, such as a global positioning system (GPS) module, match management module 216 may contact the location module to obtain location information associated with the object.

Figure 3:
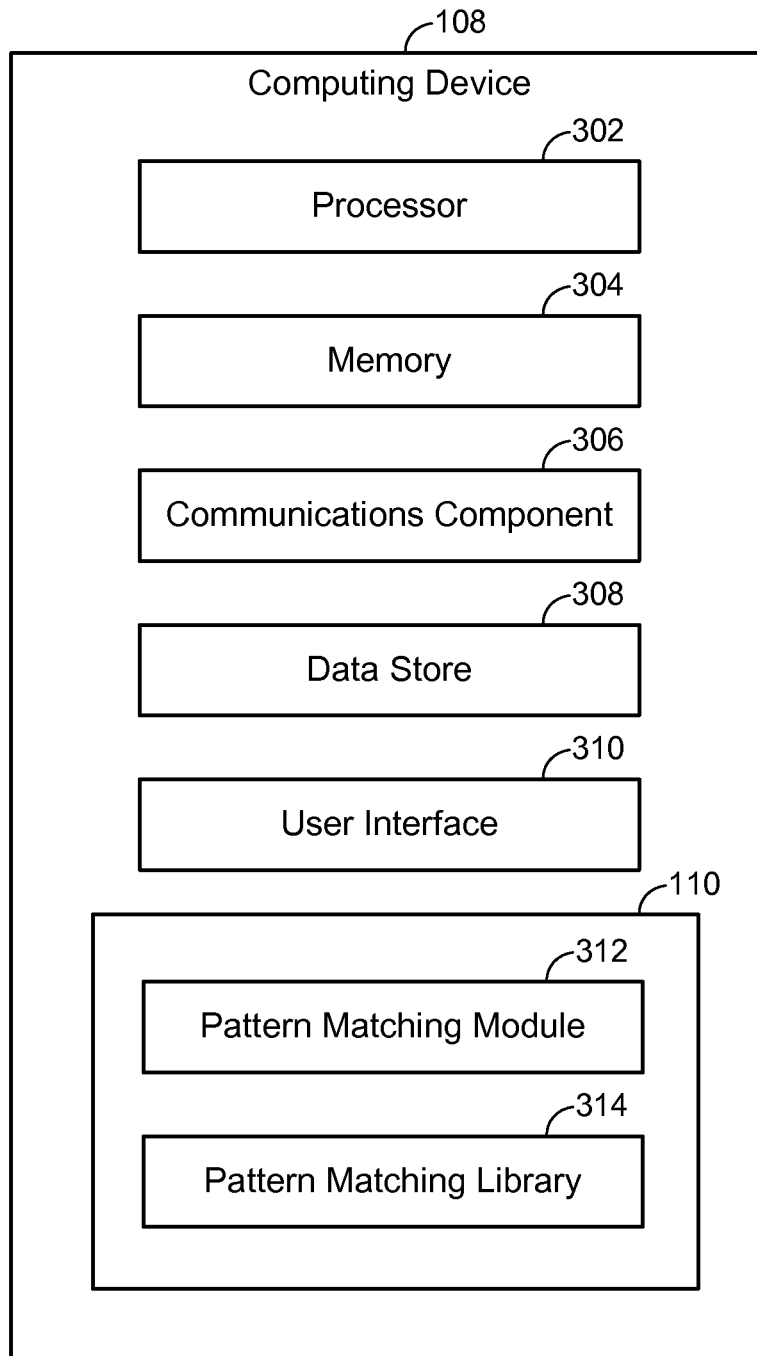
FIG. 3 depicts an exemplary computing device in accordance with some aspects.

FIG. 3 depicts computing device 108 in greater detail. Computing device 108 may include a processor 302, memory 304, communications component 306, data store 308, and user interface 310, such as an application programming interface (API). These components operate in a manner similar to the corresponding components of communication device 102, and further description will not be provided. Computing device 108 may also include remote object identification component 110, which may include a pattern matching module 312 configured to provide pattern matching for objects received from a client device, such as communication device 102. Pattern matching module 312 may implement one or more partial matching functions (F(x)) to compute one or more possible matches for an object received, and may provide a confidence factor associated with each possible match. For example, the confidence factor may indicate that a certain percentage of the pattern matches a known pattern. The confidence factor may represent a degree of correlation between the object and the possible match. In some aspects, the partial matching function(s) (F(x)) on computing device 108 may be the same as the one or more matching functions on communication device 102, whereas in other aspects the matching function on communication device 102 may be a more simple version of the partial matching function (F(x)). Pattern matching module 312 may receive an initial reduced set of features to be processed, and may use this initial reduced set of features to attempt to provide a match. If a match meeting a pre-defined minimal confidence factor cannot be found, pattern matching module 312 may repeat the search with additional received reduced sets of features, e.g. the additional reduced sets of features being progressively sent by communication device 102.

In some aspects, remote object identification component 110 may include a pattern matching library 314 for searching for objects matching the received reduced sets of features. The pattern matching library 314 may store identity information about the object, e.g. a known object, as well as other information, such as universal resource locators (URLs) to shopping or informational websites associated with the matched objects, location information, advertisements, etc. When providing the potential matches, pattern matching module 312 may also provide the additional information corresponding to the object.

Figure 4:
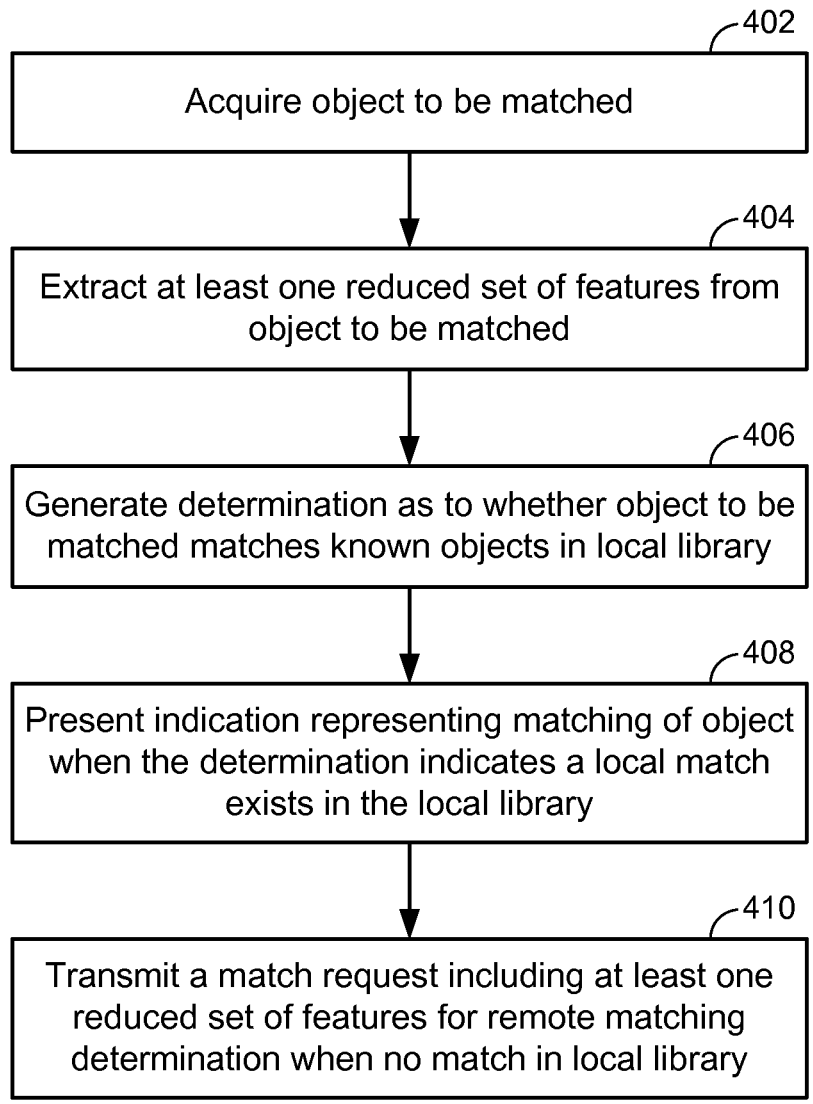
FIG. 4 depicts a method for performing pattern matching, in accordance with some aspects.

FIG. 4 depicts an exemplary method 400 for efficiently performing pattern matching in a client-server network. In some aspects, method 400 may be performed by communication device 102 depicted in FIGS. 1 and 2. As shown at 402, an object to be matched may be acquired. For example, communication device 102 may acquire an object via one of its input devices, such as a still camera, video camera, audio recorder, character recognition module, etc. The object may then undergo a feature extraction process, such as performed by feature extraction module 212 (FIG. 2) to extract at least one reduced set of features from the object to be matched, as depicted at 404. As depicted at 406, a determination is generated as to whether the object to be matched matches one of a plurality of known objects in a local library stored on the communication device. In some aspects, for example, match management module 216 may search the local pattern matching library 214 using the complete object to be matched. In other aspects, the local pattern matching library may be searched using one or more reduced sets of features. An indication representing a match of the object is presented when the determination indicates a local match exists in the local library, as depicted at 408. If no local match can be found, a match request including the at least one reduced set of features is transmitted for remote matching, as depicted at 410. For example, the match request may be transmitted to an external computational device, such as computing device 108 depicted in FIGS. 1 and 3. In accordance with some aspects, the initial reduced set of features may be a reduced set of features having a smaller data and/or memory size relative to an original data and/or memory size of the object to be matched. In some aspects, additional reduced sets of features may be transmitted to the server until a match meeting a confidence factor is returned. For example, the additional reduced sets of features may be transmitted substantially continuously or periodically. In an aspect, each additional reduced set of features may be slightly larger and/or contain more information or different information than the previously transmitted reduced set of features. In some aspects, the one or more reduced sets of features are each extracted prior to performing the search of the local library or transmitting any reduced sets of features to the server for processing. In other aspects, an initial reduced feature set is extracted and additional reduced sets of features are extracted as needed.

While FIG. 4 depicts an exemplary method wherein a local library is searched prior to transmitting a match request to a remote computational component, in some aspects, a local search may not be performed. For example, communication device 102 may be configured to determine that a local match is unlikely with respect to a particular object to be matched. As such, one or more reduced sets of features extracted from the object to be matched may be transmitted directly to the remote computational component without first performing a local search.

In accordance with some aspects, communication device 102 may include one or more context-specific pattern matching applications. For example, product or service providers may provide applications for identifying certain types of objects. For example, a specific pattern matching application may be provided for matching music clips, for recognizing road signs, flowers, bugs, sign language gestures, barcodes, etc. These applications may be stored, for example, in memory 204 and/or data store 208 (FIG. 2). As such, feature extraction module 212 and/or match management module 216 may be implemented via the launch of one or more context-specific pattern matching applications. In some aspects, contextual information associated with extracted reduced sets of features may be inherent to the context-specific pattern matching application.

Figure 5:
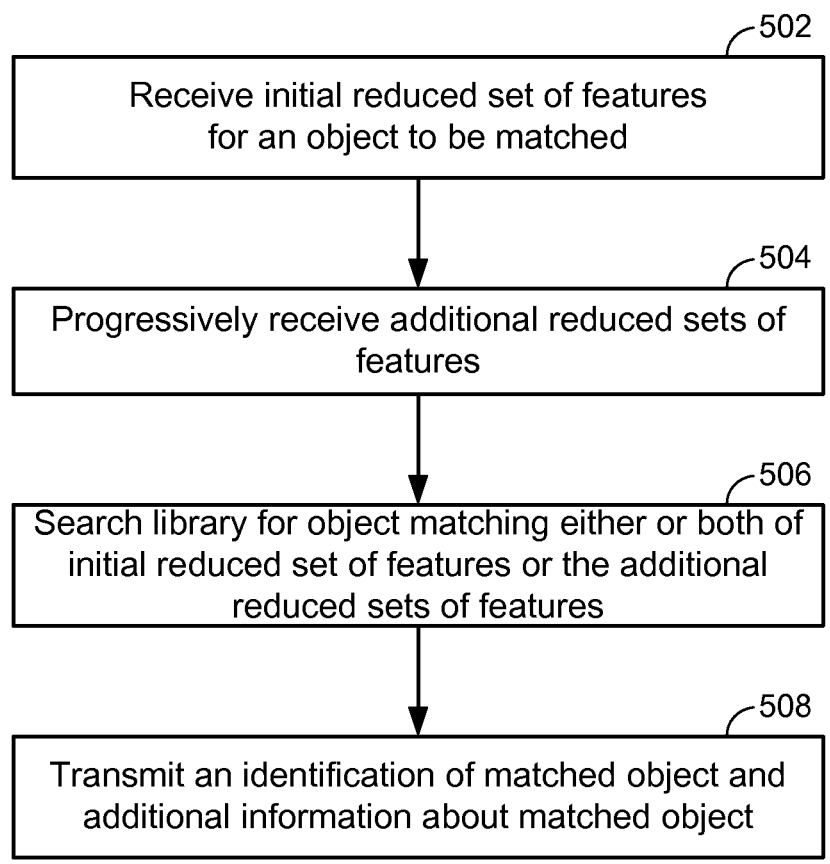
FIG. 5 depicts a method for using pattern recognition to present information, in accordance with some aspects.

FIG. 5 depicts an exemplary method 500 for using pattern recognition to present information. In some aspects, method 500 may be implemented by computing device 108, depicted in FIGS. 1 and 3. As shown at 502, an initial reduced set of features from an object to be matched may be received. As shown at 504, additional reduced sets of features may be progressively received. As depicted at 506, the server may search a library for an object matching either or both of the initial reduced set of features and the additional reduced sets of features until a potential match is found that meets a confidence factor. In some aspects, computing device computes a confidence factor for each potential match, and assigns a minimum confidence level for indicating a match. As depicted at 506, an identification of the matched object and additional information about the matched object may be transmitted upon determining a potential match for the object. In some aspects, a plurality of potential matches may be transmitted. In other aspects, only a single option having the highest confidence factor is transmitted. In accordance with some aspects, computing device 108 may transmit additional information about the matched object. For example, the additional information may include URL links to shopping or informational websites associated with the matched object, location information, advertisements, etc.

One example wherein the described apparatus and methods can be implemented is augmented reality (AR). For example, if a device transmits a picture of a flat tire to the server, the server may provide information to be overlaid on a display of the device providing step by step instructions for changing the tire. Another example where progressive pattern recognition starting with low resolution patterns would be beneficial is a remote computer-based American Sign Language (ASL) translator. Rather than sending a video of finger and hand movements representing ASL gestures to the remote computer, e.g. a server on the Internet, to translate the meaning to text or speech, gestures could be detected on the device, and a reduced data set version of the image could be uploaded, often reducing the amount of data involved by two or three orders of magnitude.

Figure 6:
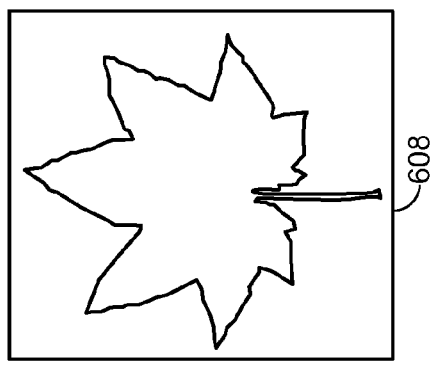
FIG. 6 depicts an exemplary object and reduced sets of features, in accordance with some aspects.
Figure 6:
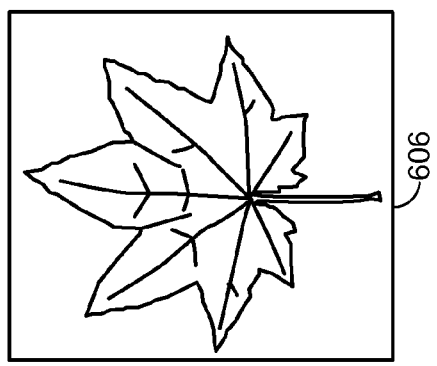
Figure 6:
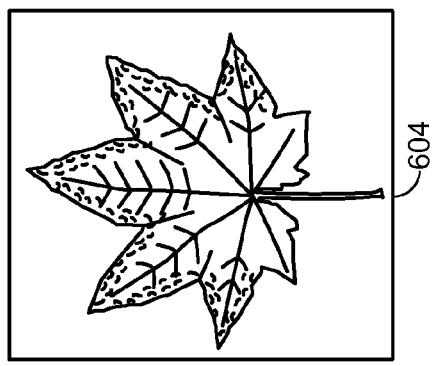
Figure 6:
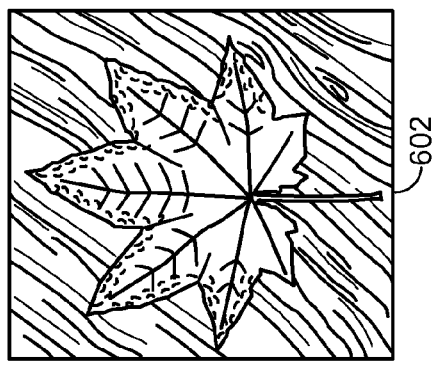

FIG. 6 illustrates one aspect of an original object and a series of reduced sets of features extracted from the original object in the form of an exemplary set of images for which the progressive search described herein can be applied. As depicted at 602, an original image of a maple leave has been captured. The original image would require sending approximated 245 kB of image data. As shown at 604, background data has been removed from the original image via scissoring. Simply removing the background information results in a significantly smaller image—approximately 80 kB. As shown at 606, further processing is done to the original image using a progressive encoding scheme such as JPEG progressive encoding. This image is further reduced in size to 40 kB. Finally, as shown at 608, edge detection is performed resulting in an outline of the object that is only 4 kB in size.

To perform progressive pattern matching according to one aspect of the described apparatus and methods, a client device such as communication device 102 may first search a local library to identify the object to be matched based on the original image shown at 602, and/or on one or more of the reduced sets of features shown at 604, 606, and 608. If a local match cannot be found, the communication device 102 may transmit the reduced set of features shown at 608 to a server. In this case, for an object like a maple leaf with such a distinct outline, this minimal information may be sufficient to recognize the object with a high degree of confidence, and requires sending 60 times less data than the original image. However, if the server was unable to find a match meeting an approved confidence level, the communication device could next transmit the reduced set of features shown at 606. The communication device could then continue to progressively send additional reduced sets of features, e.g. the reduced sets of features at 604 and then at 602, until a match is found meeting the confidence level, sending the original image at 602 only as a last resort.

Figure 7:
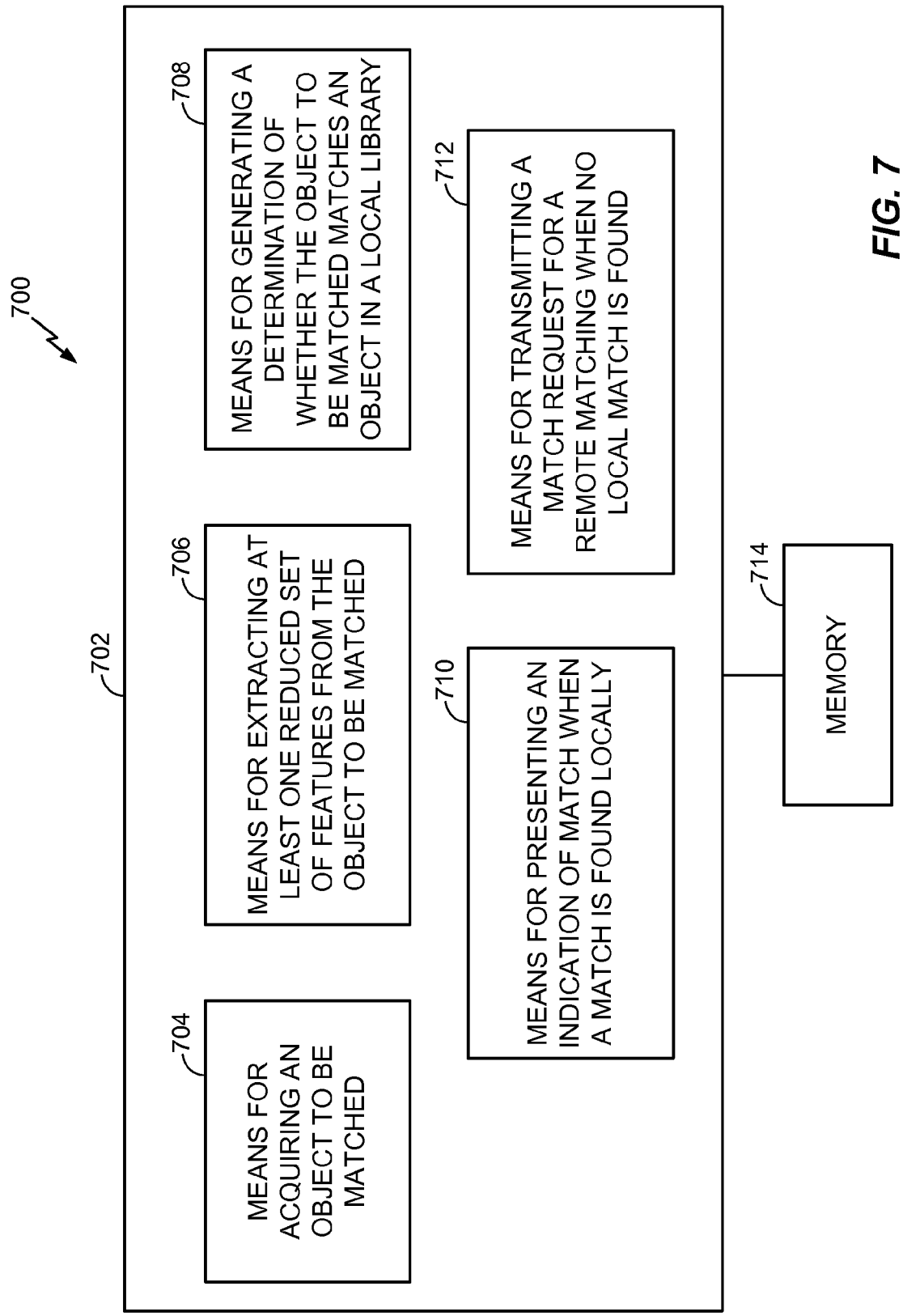
FIG. 7 depicts an apparatus for performing pattern matching, in accordance with some aspects.

Referring to FIG. 7, an apparatus 700 that efficiently performs pattern matching in a client-server network can reside at least partially within communication device 102. It is to be appreciated that apparatus 700 is represented as including functional blocks, which can represent functions implemented by a processor, software, or combination thereof (e.g., firmware). As such, apparatus 700 includes a logical grouping 702 of electrical components that can act in conjunction. For instance, logical grouping 702 may include means for acquiring an object to be matched (704). For example, in an aspect, the means 704 can include user interface component 210 and/or processor 202. Logical grouping 702 can include means for extracting at least one reduced set of features from the object to be matched (706). For example, in an aspect, the means 706 can include feature extraction module 212 and/or or processor 202. Further, logical grouping 702 can include means for generating a determination as to whether the object to be matched matches one of a plurality of known objects in a local library stored on the communication device (708). In an aspect, the means 708 may include local pattern matching library 214, user interface component 210, and/or processor 202. Also, logical grouping 702 can include means for presenting an indication representing a match of the object if the determination indicates a local match exists in the local library (Block 710). In an aspect, the means 708 may include local pattern matching library 214, user interface component 210, and/or processor 202. In addition, logical grouping 702 can include means for transmitting a match request including the at least one reduced set of features for a remote matching determination when the determination indicates that no local match exists in the local library (712). In an aspect, the means 712 may include communications component 206, feature extraction module 212, and/or processor 202.

Additionally, apparatus 700 can include a memory 714 that retains instructions for executing functions associated with 704-712. While shown as being external to memory 714, it is to be understood that one or more of 704-712 can exist within memory 714. In an aspect, for example, memory 714 may be the same as or similar to memory 204 or data store 208 (FIG. 2).

Figure 8:
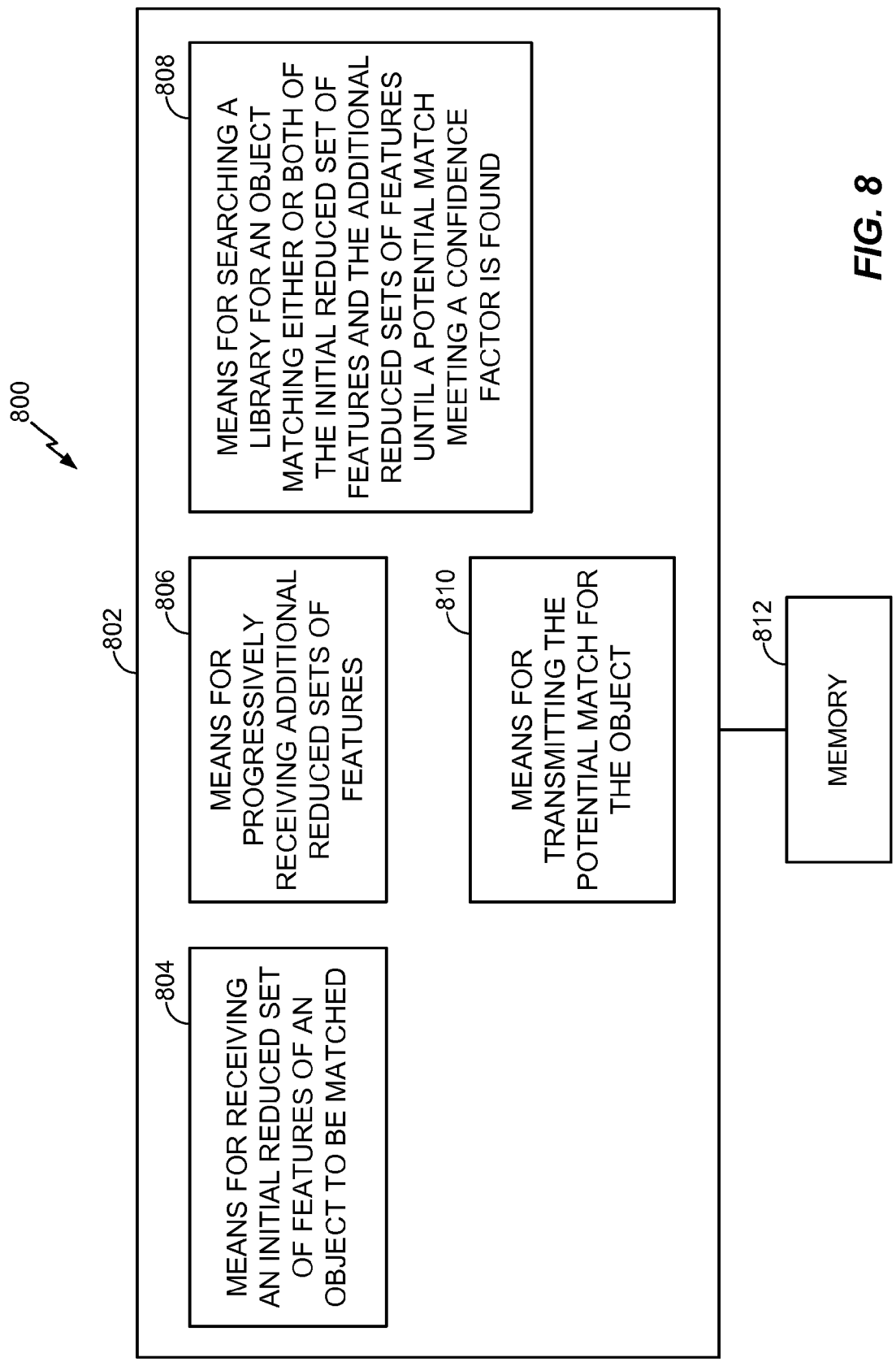
FIG. 8 depicts an apparatus for using pattern recognition to present information, in accordance with some aspects.

FIG. 8 depicts an apparatus 800 that efficiently uses pattern recognition to present information. Apparatus 800 can reside at least partially within computing device 108. It is to be appreciated that apparatus 800 is represented as including functional blocks, which can represent functions implemented by a processor, software, or combination thereof (e.g., firmware). As such, apparatus 800 includes a logical grouping 802 of electrical components that can act in conjunction. For instance, logical grouping 802 can include means for receiving an initial reduced set of features from an object to be matched (804). For example, in an aspect, the means 804 may include pattern matching module 312, communications component 306 and/or or processor 302. Further, logical grouping 802 can include means for progressively receiving additional reduced sets of features (806). For example, in an aspect, the means 806 can include pattern matching module 312, communications component 306 and/or or processor 302. Also, logical grouping 802 can include means for searching a library for an object matching either or both of the initial reduced set of features and the additional reduced sets of features until a potential match is found that meets a confidence factor (808). For example, in an aspect, the means 808 can include pattern matching module 312, pattern matching library 314, and/or processor 302. Logical grouping 802 may also include means for transmitting an identification of the matched object upon determining the potential match for the object (810). For example, in an aspect, the means 810 can include pattern matching module 312, communications component 306 and/or or processor 302

Additionally, apparatus 800 can include a memory 812 that retains instructions for executing functions associated with 804, 806, 808, and 810. While shown as being external to memory 812, it is to be understood that one or more of 804, 806, 808, and 810 can exist within memory 812. In an aspect, for example, memory 812 may be the same as or similar to memory 304 or data store 308 (FIG. 3).

In the subject disclosure, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a communication device, which can be a wired communication device or a wireless communication device. A communication device can also be called a system, device, client device, subscriber unit, subscriber station, mobile station, mobile, mobile device, remote station, remote terminal, access terminal, user terminal, terminal, communication device, user agent, user device, or user equipment (UE). A communication device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with communication device(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various personal, local or wide area communication systems such as Bluetooth, WiFi, CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of efficiently performing pattern matching in a client-server network, comprising:
    acquiring, by a communication device, an object to be matched;
    extracting a first reduced set of one or more features from the object;
    generating a first local match determination as to whether the object matches one of a plurality of known objects stored on the communication device based on the first reduced set of one or more features;
    presenting an indication representing a match of the object if the first local match determination indicates a local match has been found;
    extracting one or more additional reduced sets of one or more features from the object including at least a second reduced set of one or more features in response to the generated determination indicating that no local match has been found;
    generating at least a second local match determination as to whether the object matches one of a plurality of known objects stored on the communication device, the second local match determination being based on the second reduced set of one or more features;
    presenting an indication representing a match of the object if the second local match determination indicates a local match has been found;
    transmitting one or more remote match requests for determining whether the object matches one of a plurality of objects available remotely based on a reduced set of one or more features associated with each of the one or more remote match requests, the reduced set of one or more features associated with each of the one or more remote match requests including one or more features of the first reduced set of one or more features, or one of the one or more additional reduced sets when the second local match determination indicates that no local match has been found.

2. The method of claim 1, wherein generating the first local match determination comprises searching for the local match based on a complete representation of the object.

3. The method of claim 1, wherein generating the first local match determination comprises searching for the local match based on the first reduced set of one or more features extracted from the object.

4. The method of claim 1, further comprising:
    terminating the transmitting of the one or more remote match requests in response to receiving an indication that the remote matching determination found a remote match.

5. The method of claim 1, wherein the one or more additional reduced sets of one or more features are progressively transmitted in a substantially continuous manner.

6. The method of claim 1, wherein the one or more additional reduced sets of one or more features are progressively transmitted on a periodic basis.

7. The method of claim 1, further comprising:
    receiving a server-initiated request for additional information about the object; and
    transmitting one or more additional remote match requests in response to the server-initiated request.

8. The method of claim 1, further comprising:
    transmitting context information with at least one of the first reduced set of one or more features, at least one of the one or more additional reduced sets of one or more features, or any combination thereof; and
    receiving one or more potential matches for the object.

9. The method of claim 8, wherein the context information comprises at least one of location information, user preference information, time information, or any combination thereof.

10. The method of claim 8, further comprising:
    launching a context-specific pattern matching application; and
    obtaining the object through execution of the context-specific pattern matching application, wherein the context information is inherent to or derived from the context-specific pattern matching application.

11. The method of claim 1, further comprising:
generating one or more additional determinations as to whether the object matches one of the plurality of known objects stored on the communication device based on one or more of at least one reduced set of one or more features or the one or more additional reduced sets of one or more features extracted from the object;
progressively searching for the local match of the object based on at least one of the one or more additional reduced sets of one or more features when no local match has been found.

12. The method of claim 11, further comprising:
progressively transmitting the one or more remote match requests to a server in response to the one or more additional determinations indicating that no local match has been found;
progressively receiving one or more responses to the one or more remote match requests; and
terminating the extracting of the one or more additional reduced sets of one or more features, the generating of the one or more additional determinations, progressively searching for the local match of the object and the progressively transmitting of the one or more remote match requests in response to at least one of the additional determinations indicating that a local match has been found, at least one of the progressively received responses identifying a remote matching object, or any combination thereof.

13. The method of claim 1, further comprising:
receiving a response to the one or more remote match requests, wherein the response comprises one or more potential matches for the object.

14. The method of claim 13, further comprising:
terminating the transmitting of the one or more remote match requests in response to receiving a user input indicating a selected one of the one or more potential matches as being a matching object.

15. The method of claim 13, further comprising:
continuing to transmit the one or more remote match requests for the remote matching determination in response to receiving a user input that does not indicate a matching object among the one or more potential matches.

16. The method of claim 1, further comprising:
receiving a response to the one or more remote match requests, wherein the response comprises a matching object having a match confidence level that exceeds a confidence level threshold.

17. The method of claim 1, wherein extracting comprises at least one of removing background information from an original representation of the object, using a progressive encoding scheme to process the original representation of the object, performing an edge detection operation to produce an outline of the object, or any combination thereof.

18. The method of claim 1, wherein the object comprises at least one of a static image, a dynamic image, an audio recording, or any combination thereof.

19. The method of claim 1, wherein the object comprises at least one of an image, a matrix, a barcode, a word, a letter, a sign language gesture, a song, or any combination thereof.

20. The method of claim 1, wherein the first reduced set of one or more features has a smaller data size relative to the acquired object.

21. The method of claim 1, wherein the one or more additional reduced sets of one or more features are progressively transmitted such that the progressively transmitted additional reduced sets of one or more features each has one or more of a larger size, more information, or different information than a previously transmitted reduced set of one or more features, or any combination thereof.

22. The method of claim 1, further comprising:
transmitting an original version of the object in response to the remote matching determination not finding a remote match meeting an approved confidence level from at least one reduced set of one or more features and the one or more additional reduced sets of one or more features.

23. The method of claim 1, wherein the first reduced set of one or more features and the one or more additional reduced sets of one or more features are each extracted from the object prior to generating the determination as to whether the object matches one of the plurality of known objects stored on the communication device.

24. The method of claim 1, wherein the first reduced set of one or more features are extracted from the object prior to generating the first local match determination as to whether the object matches one of the plurality of known objects stored on the communication device and the one or more additional reduced sets of one or more features are extracted as needed.

25. The method of claim 1, wherein the first local match determination as to whether the object matches one of the plurality of known objects stored on the communication device uses a simplified version of a matching function used in the remote matching determination.

26. The method of claim 1, wherein the remote matching determination uses the same matching function used to generate the first local match determination as to whether the object matches one of the plurality of known objects stored on the communication device.

27. A non-transitory computer-readable medium, comprising:
at least one instruction for causing a computer to acquire an object to be matched;
at least one instruction for causing the computer to extract a first reduced set of one or more features from the object;
at least one instruction for causing the computer to generate a first local match determination as to whether the object matches one of a plurality of known objects stored on the computer based on the first reduced set of one or more features;
at least one instruction for causing the computer to present an indication representing a match of the object if the first local match determination indicates a local match has been found;
at least one instruction for causing the computer to extract one or more additional reduced sets of one or more features from the object including at least a second reduced set of one or more features in response to the generated determination indicating that no local match has been found;
at least one instruction for causing the computer to generate at least a second local match determination as to whether the object matches one of a plurality of known objects stored on the computer, the second local match determination being based on the second reduced set of one or more features;
at least one instruction for causing the computer to present an indication representing a match of the object if the second local match determination indicates a local match has been found;

at least one instruction for causing the computer to transmit one or more remote match requests for determining whether the object matches one of a plurality of objects available remotely based on a reduced set of one or more features associated with each of the one or more remote match requests, the reduced set of one or more features associated with each of the one or more remote match requests including one or more features of the first reduced set of one or more features, or one of the one or more additional reduced sets when the second local match determination indicates that no local match has been found; and at least one instruction for causing the computer to transmit the one or more additional reduced sets of one or more features extracted from the object for the remote matching determination when the generated determination indicates that no local match has been found.

28. An apparatus, comprising:

means for acquiring an object to be matched;

means for extracting a first reduced set of one or more features from the object;

means for generating a first local match determination as to whether the object matches one of a plurality of known objects stored on the apparatus based on the first reduced set of one or more features;

means for presenting an indication representing a match of the object if the first local match determination indicates a local match has been found;

means for extracting one or more additional reduced sets of one or more features from the object including at least a second reduced set of one or more features in response to the generated determination indicating that no local match has been found;

means for generating at least a second local match determination as to whether the object matches one of a plurality of known objects stored on a communication device, the second local match determination being based on the second reduced set of one or more features means for presenting an indication representing a match of the object if the second local match determination indicates a local match has been found; and means for transmitting one or more remote match requests for determining whether the object matches one of a plurality of objects available remotely based on a reduced set of one or more features associated with each of the one or more remote match requests, the reduced set of one or more features associated with each of the one or more remote match requests including one or more features of the first reduced set of one or more features, or one of the one or more additional reduced sets when the second local match determination indicates that no local match has been found.

29. An apparatus for efficiently performing pattern matching in a client-server network, comprising:

at least one processor configured to:
acquire an object to be matched;
extract a first reduced set of one or more features from the object;
generate a first local match determination as to whether the object matches one of a plurality of known objects stored on the apparatus based on the first reduced set of one or more features;
present an indication representing a match of the object if the first local match determination indicates a local match has been found;
extract one or more additional reduced sets of one or more features from the object including at least a second reduced set of one or more features in response to the generated determination indicating that no local match has been found;
generate at least a second local match determination as to whether the object matches one of a plurality of known objects stored on a computer, the second local match determination being based on the second reduced set of one or more features;
present an indication representing a match of the object if the second local match determination indicates a local match has been found; and
transmit one or more remote match requests for determining whether the object matches one of a plurality of objects available remotely based on a reduced set of one or more features associated with each of the one or more remote match requests, the reduced set of one or more features associated with each of the one or more remote match requests-including one or more features of the first reduced set of one or more features, or one of the one or more additional reduced sets when the second local match determination indicates that no local match has been found; and
a memory coupled to the at least one processor.

30. The apparatus of claim 29, wherein generating the first local match determination comprises searching for the local match based on a complete representation of the object.

31. The apparatus of claim 29, wherein generating the first local match determination comprises searching for the local match based on the first reduced set of one or more features extracted from the object.

32. The apparatus of claim 29, wherein the at least one processor is further configured to:
terminate the transmitting of the one or more remote match requests in response to receiving an indication that the remote matching determination found a remote match.

33. The apparatus of claim 29, wherein the one or more additional reduced sets of one or more features are progressively transmitted in a substantially continuous manner.

34. The apparatus of claim 29, wherein the one or more additional reduced sets of one or more features are progressively transmitted on a periodic basis.

35. The apparatus of claim 29, wherein the at least one processor is further configured to:
receive a server-initiated request for additional information about the object; and
transmit one or more additional remote match requests in response to the server-initiated request.

36. The apparatus of claim 29, wherein the at least one processor is further configured to:
transmit context information with at least one of the first reduced set of one or more features, at least one of the one or more additional reduced sets of one or more features, or any combination thereof; and
receive one or more potential matches for the object.

37. The apparatus of claim 36, wherein the context information comprises at least one of location information, user preference information, time information, or any combination thereof.

38. The apparatus of claim 36, wherein the at least one processor is further configured to:
launch a context-specific pattern matching application; and
obtain the object through execution of the context-specific pattern matching application, wherein the context information is inherent to or derived from the context-specific pattern matching application.

39. The apparatus of claim 29, wherein the at least one processor is further configured to:

generate one or more additional determinations as to whether the object matches one of the plurality of known objects stored on a communication device based on one or more of at least one reduced set of one or more features or the one or more additional reduced sets of one or more features extracted from the object; and progressively search for the local match of the object based on at least one of the one or more additional reduced sets of one or more features when no local match has been found.

40. The apparatus of claim 39, wherein the at least one processor is further configured to:

progressively transmit the one or more remote match requests to a server in response to the one or more additional determinations indicating that no local match has been found;

progressively receive one or more responses to the one or more remote match requests; and terminate the extracting of the one or more additional reduced sets of one or more features, the generating of the one or more additional determinations, progressively searching for the local match of the object and the progressively transmitting of the one or more remote match requests in response to at least one of the additional determinations indicating that a local match has been found, at least one of the progressively received responses identifying a remote match, or any combination thereof.

41. The apparatus of claim 29, wherein the at least one processor is further configured to:

receive a response to the one or more remote match requests, wherein the response comprises one or more potential matches for the object.

42. The apparatus of claim 41, wherein the at least one processor is further configured to:

terminate the transmitting of the one or more remote match requests in response to a user input indicating a selected one of the one or more potential matches as being a matching object.

43. The apparatus of claim 41, wherein the at least one processor is further configured to:

continue to transmit the one or more remote match requests for the remote matching determination in response to a user input that does not indicate a matching object among the one or more potential matches.

44. The apparatus of claim 29, wherein the at least one processor is further configured to:

receive a response to the one or more remote match requests, wherein the response comprises a matching object having a match confidence level that exceeds a confidence level threshold.

45. The apparatus of claim 29, wherein extracting comprises at least one of removing background information from an original representation of the object, using a progressive encoding scheme to process the original representation of the object, performing an edge detection operation to produce an outline of the object, or any combination thereof.

46. The apparatus of claim 29, wherein the object comprises at least one of a static image, a dynamic image, an audio recording, or any combination thereof.

47. The apparatus of claim 29, wherein the object comprises at least one of an image, a matrix, a barcode, a word, a letter, a sign language gesture, a song, or any combination thereof.

* * * * *